Nov. 17, 1925.
S. A. KRAFT
HYDRAULIC CLUTCH
Filed Feb. 11, 1922
1,561,549
3 Sheets-Sheet 1
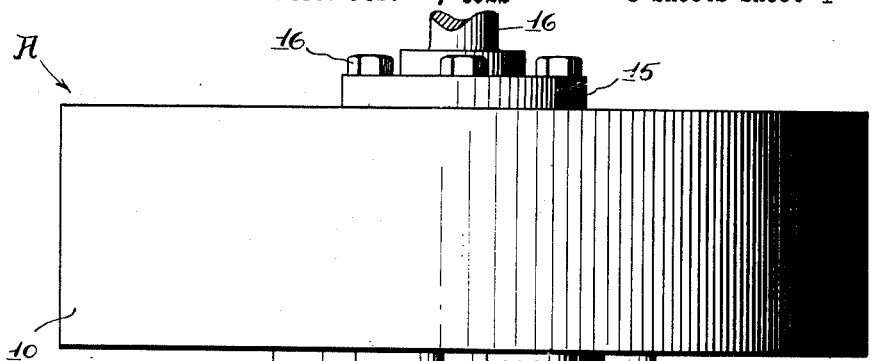
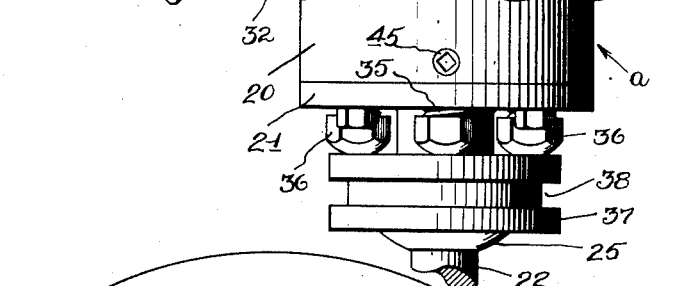
Fig. 1
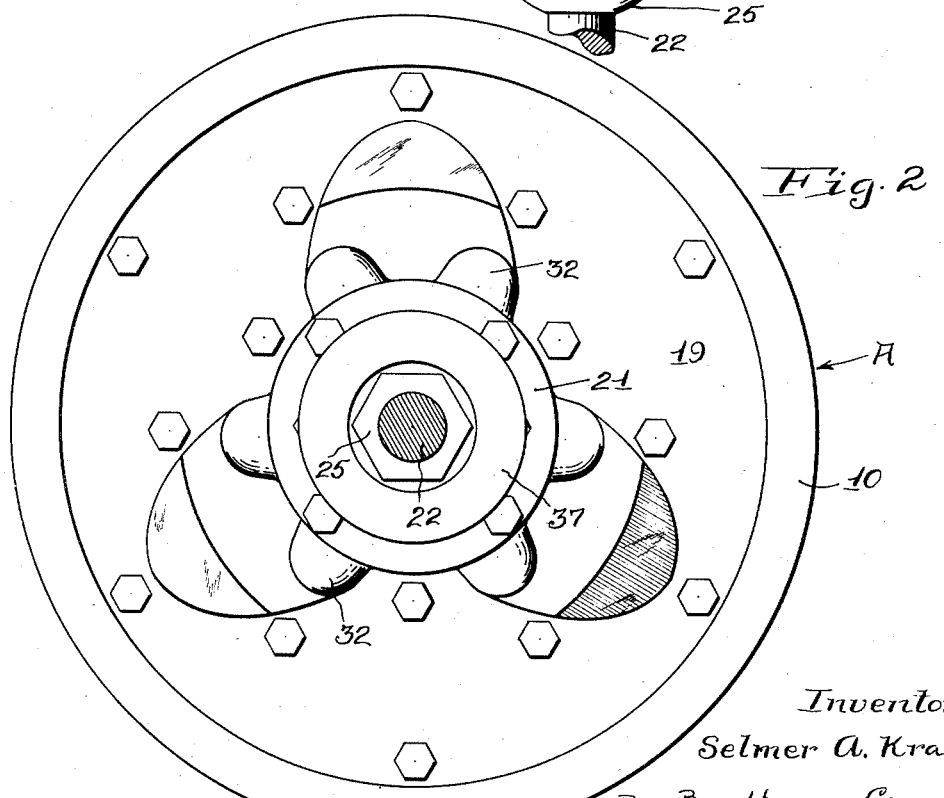
Fig. 2
Inventor
Selmer A. Kraft
By Bradbury & Caswell
Attorneys

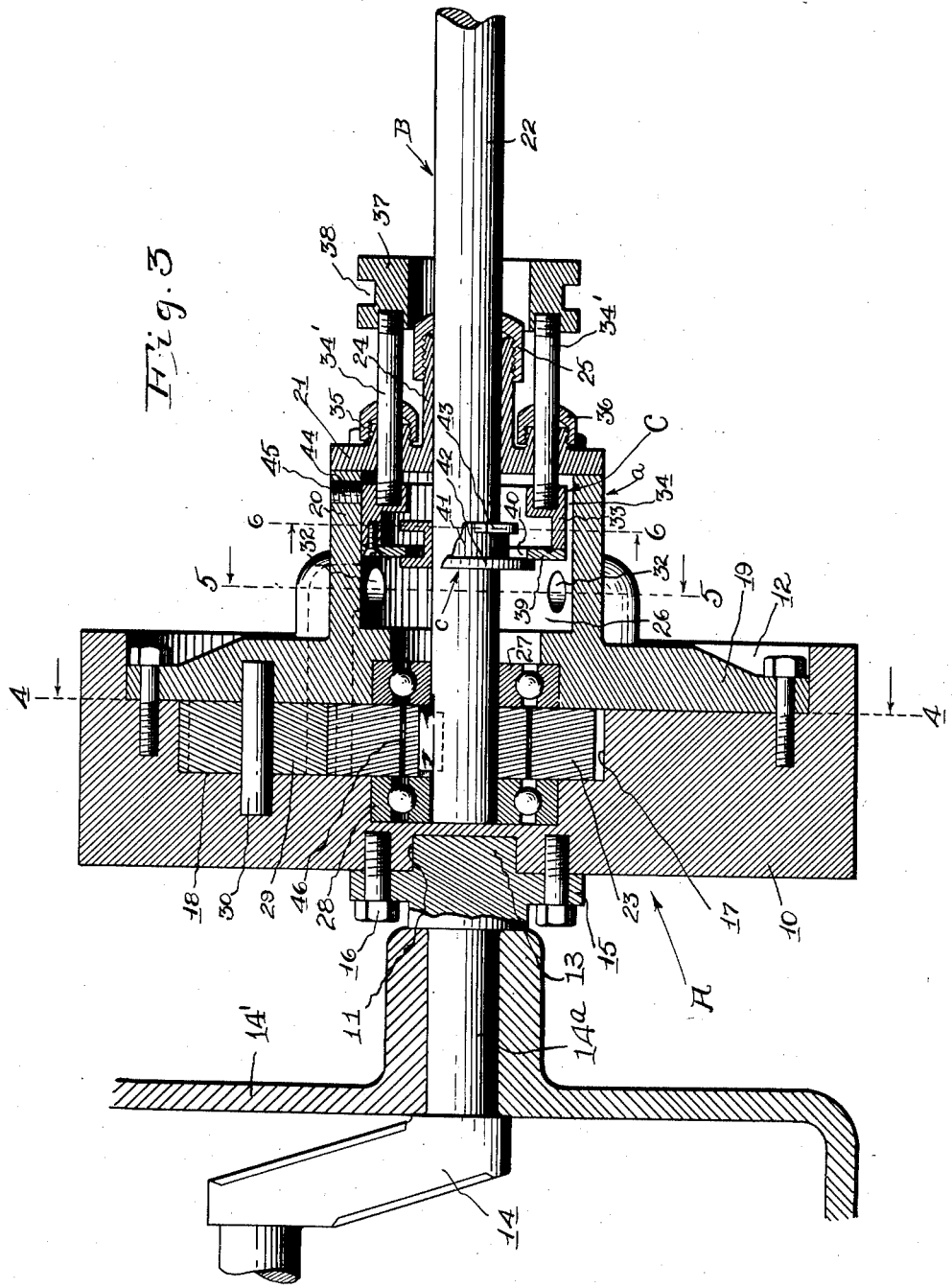

Nov. 17, 1925.  1,561,549
S. A. KRAFT
HYDRAULIC CLUTCH
Filed Feb. 11, 1922  3 Sheets-Sheet 3

Inventor
Selmer A. Kraft
By Bradbury & Caswell
Attorneys

Patented Nov. 17, 1925.

1,561,549

UNITED STATES PATENT OFFICE.

SELMER A. KRAFT, OF ST. PAUL, MINNESOTA.

HYDRAULIC CLUTCH.

Application filed February 11, 1922. Serial No. 535,904.

*To all whom it may concern:*

Be it known that I, SELMER A. KRAFT, a citizen of the United States, residing at St. Paul, in the county of Ramsey and State of Minnesota, have invented a new and useful Hydraulic Clutch, of which the following is a specification.

My invention relates to improvements in hydraulic clutches.

One object is to provide, a simple, durable and efficient device of this kind, compact in form and adapted to be fitted within the confines usually provided for clutch mechanisms in the present ordinary types of motor vehicles.

Another object is to supply a device of the present nature designed to supply the balancing medium for the power unit with which it is associated and arranged to be supported principally by said power unit.

Another object is to provide a clutch employing a fluid to yieldingly couple the driven member with the driving member thereof, said clutch being so designed that the coupling medium is propelled therein at speeds decreasing correspondingly with respect to decreasing speeds between the clutch members, to the end that friction may be avoided when the driven element is turned in unison with the power element.

A further object is to supply a clutch, as above, the driven member thereof being adapted to be quickly and easily freed from the driving member, the re-coupling of said driven member with the driving member being automatically regulated to insure the gradual resumption of speed of the former.

With the foregoing and other objects in view, which will appear in the following description, the invention resides in the novel combination and arrangement of parts and in the details of construction hereinafter described and claimed.

Figure 5:
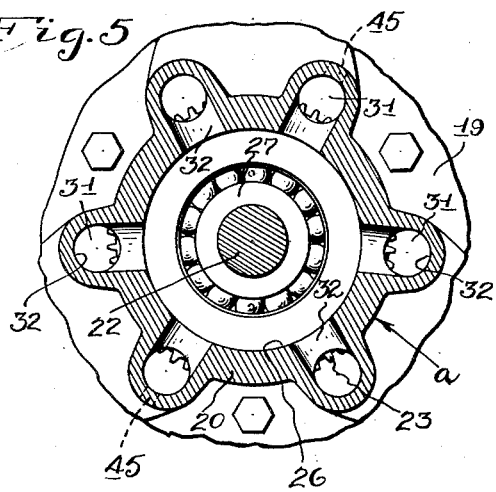
Figure 6:
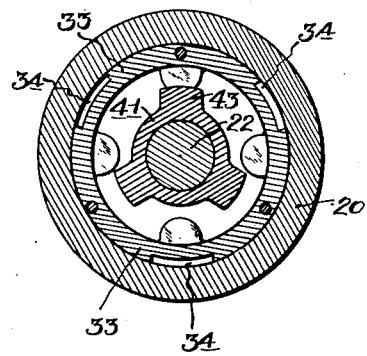
Figure 4:
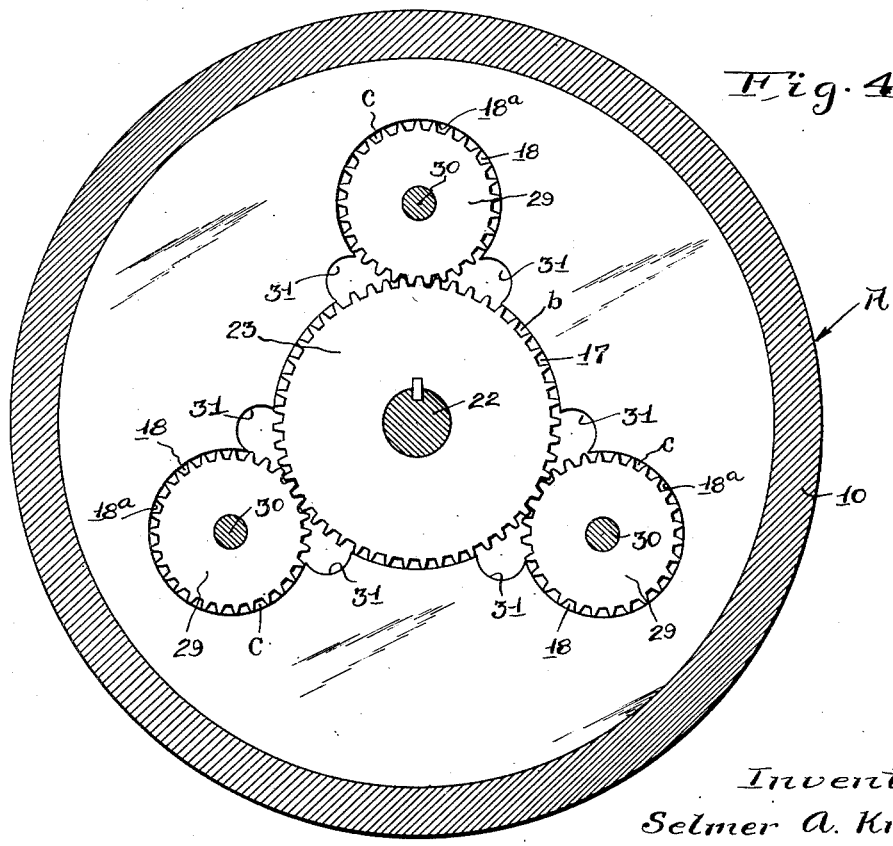

In the drawings, Fig. 1 is a plan view of a clutch embodying my invention; Fig. 2 is a rear elevation thereof; Fig. 3 is a central, longitudinal, sectional view of the same; Fig. 4 is a transverse sectional view taken on the line 4—4 of Fig. 3; Fig. 5 is a detail sectional view taken on the line 5—5 of Fig. 3 and Fig. 6 is a similar view taken on the line 6—6 of said Fig. 3.

Referring to the drawings, I have indicated the driving and driven elements of my improved clutch by the reference letters A and B respectively. The driving member A includes a wheel-like body 10 formed with an axial, annular recess 11 in its front side and a similar but larger annular recess 12 in the rear side thereof. The body 10 closely resembles the ordinary fly wheel of the present type of internal combustion engine. The recess 11 in said body 10 is designed to receive the boss 13 of the ordinary crank shaft 14, the flange 15 on said shaft being secured to the body 10 by the usual anchoring bolts 16. The weight of the body 10 and of associated parts is carried almost entirely by the crank shaft 14, through the usual crank case 14' therefor, said shaft being fitted with the usual journal $14^a$ closely adjacent to said flange 15. The rear side of the body 10, within the recess 12, is formed with an axial gear receiving recess 17 and with radial gear receiving recesses 18, the former communicating with the latter as shown in Fig. 4. A head-piece $a$ removably secured to the body 10, includes an annular plate 19 and an axial cylinder 20 integral with said plate, said cylinder being supplied with a cap or closure 21 for the rear end thereof. The driven member B includes a propeller shaft 22 and a spur gear 23 keyed thereon. Said shaft is journaled at the rear of the clutch in a bearing 24 on the cap 21, said bearing being fitted with a packing gland 25 to prevent the escape of fluid from the chamber 26, within the cylinder 20. A roller bearing 27, carried by the head-piece $a$ at the rear of the gear 23, and a similar bearing 28, carried by the body 10 in front of the gear 23, co-operate with the bearing 24 in revolubly supporting the shaft 22.

The gear 23 on the shaft 22 fits snugly within the compartment $b$ formed by the axial recess 17, in the body 10, and the plate 19 of the head-piece $a$. Said gear 23 meshes with planetary gears 29, which fit snugly in the compartments $c$ formed by the radial recesses 18 and said plate 19. These planetary gears 29 are journaled on axes 30 carried between the body 10 and plate 19. In the body 10 and on each side of the meshing portions of the gears 29 and 23 is a pocket 31 opening into the adjacent gear receiving recess 18. The two pockets 31 for each of the meshing portions of said gears register with the forward ends of companion ducts 32 in the head-piece $a$, said ducts communicating with the chamber 26 at their rear ends. One duct 32 together with its communicating pocket 31 supplies a passage-way from the chamber 26 to one side of the meshing portions of one gear 29 and the gear 23, while the companion duct 32 and its communicating pocket 31 supplies a similar passage-way leading from the opposite side of said meshing gear portions to said chamber. Upon the rotation of the clutch driving member A, a fluid within the clutch is drawn from the chamber 26 through one of each pair of ducts 32 into the registering pocket 31, thence is carried between the teeth of a rotating gear 29 and the adjacent recess wall 18$^a$ to the companion pocket 31 from which it is returned to the chamber 26, through the companion duct 32. This circuitous flow of said fluid permits of the rotary meshing of the gears 29 with the gear 23, upon the rotation of the driving member A, the turning of said driving member being unattended by the relative rotation of the driven member B. I arrange a piston valve C in the chamber 26, said valve being common to all of the ducts 32 and designed to obstruct the same. By obstructing said ducts, the circulation of fluid therethrough is arrested, and a fluid lock formed between the gears 29 and 23. Upon the locking of said gears, the rotation of the gears 29 about their axes ceases and the planetary movement of said gears is imparted to the gear 23 and the connected propeller shaft 22. The piston valve C is slidable to impede the circulation of fluid within said ducts 32 and thereby permit of various peripheral speeds between the gears 29 and 23 and the consequent variation in relative speeds between the driving and driven members A and B. Said piston valve C includes a hollow cylindrical shell 33 formed with longitudinal grooves 34 in the outer surface thereof. Studs 34', threaded in said shell 33, slide in bearings 35 on the cap 21. These bearings 35 are fitted with packing glands 36, the ends of said studs 34' being extended rearwardly beyond said glands and secured to an actuating collar 37 grooved, as at 38, to receive the ordinary clutch shifter-yoke (not shown). The head 39 of the piston valve C is formed with an annular opening 40 therein, through which the shaft 22 extends. A check valve $c$ for said opening includes a hub 41, slidable and revoluble on the shaft 22, a flange 42 and arms 43 on said hub. The usual clutch shifter-yoke and associated mechanism includes a spring to shift the yoke in one direction. The shifting of the collar 37 forwardly, as by means of such spring operated mechanism, or otherwise, results in advancing the piston valve C (to the left Fig. 3). Upon such movement of the piston valve, the opening 40 in the head 39 thereof is sealed by the flange 42 of the check valve $c$, the fluid within the chamber 26 being required to take the more restricted course, through the grooves 34, in passing the piston valve C, as it moves forward from the rear of the chamber 26. The restricted flow of fluid, through said grooves 34, causes the piston C to lag in its forward thrust and thereby gradually obstruct the ducts 32. This provision automatically insures the gradual increase in speed of the driven clutch member B with respect to the driving member A. In retracting the collar 37, to free the driven clutch member B, the flange 42 is unseated from the head 39 of the piston valve C, whereupon the fluid at the rear of the piston valve is allowed to pass, practically unrestricted, through the relatively large opening 40 in the piston head 39. The resultant freedom of reverse movement of the piston valve, thus permits of instantaneous freeing of the clutch members A and B. The arms 43, above mentioned, are engaged by the head 39 of the piston valve, upon its return thrust, thus limiting the unseating movement of said flange 42, with respect to the head 39. The coupling fluid best suited to my improved clutch is a light lubricating oil. This fluid is admitted to the chamber 26 and communicating passage-ways through filler openings 4 in the head-piece $a$, threaded plugs 45 being supplied to close said openings. The gear 23 is formed with lubricating leads 46 to carry the fluid from the chamber 26 to the bearing 28 on the forward side of said gear.

Among the several important features residing in my improvement, particular attention is invited to the following: The clutch structure is carried practically entirely by the power element and supplies the balancing medium therefor; it occupies only that space usually taken by ordinary friction clutches; it has but few parts, the same being inexpensive, durable and easily assembled; and the automatic slow acting feature of the fluid trapping piston insures the gradual coupling of the clutch members and the consequent longevity of the structure and of parts associated therewith.

Changes in the specific form of my invention, as herein disclosed, may be made within the scope of what is claimed without departing from the spirit of my invention.

Having described my invention, what I claim as new and desire to protect by Letters Patent is:

1. In a clutch, a rotary driving member including a body having an axial and radially arranged gear receiving compartments therein, also an axial fluid chamber, a driven shaft journaled in said body and passing axially through said fluid chamber, a gear fixed to said shaft and fitted within said axial compartment, planetary gears journaled in said body within said radial compartments and meshing with said axial gear, passage-ways leading from and returning to said fluid chamber, each passage-way being intercepted by a planetary gear and the adjacent meshing portion of said axial gear, a piston slidable in said chamber and adapted to simultaneously obstruct said passage-ways and a valve member associated with said piston to retard the movement thereof in a direction to obstruct said passage-ways, said member being slidably and revolubly mounted on said shaft.

2. In a clutch, a rotary driving member including a body having an axial and radially arranged gear receiving compartments therein, also an axial fluid chamber, a driven shaft journaled in said body, a gear fixed to said shaft and fitted within said axial compartment, planetary gears journaled in said body within said radial compartments and meshing with said axial gear, passage-ways leading from and returning to said fluid chamber, each passage-way being intercepted by a planetary gear and the adjacent meshing portion of said axial gear, a piston slidable in said chamber and adapted to obstruct said passage-ways, and a valve member associated with said piston to retard the movement thereof in a direction to obstruct said passage-ways.

3. In a clutch, a rotary driving member including a body formed with an axial and radially arranged gear receiving compartments and also with an axial fluid chamber therein, a rotary driven member including a propeller shaft journaled in said body and a gear fixed to said shaft and fitting closely within the axial compartment in said driving member, planetary gears journaled within the radially arranged compartments in the driving member and meshing with the gear on said shaft, said driving member being supplied with passage-ways, each intercepted by one of the planetary gears and the adjacent meshing portion of the axial gear, each passage-way leading from the chamber at one point and back to said chamber at another point, a valve in said chamber common to all of said passage-ways and adapted to obstruct the same, whereby more or less resistance may be offered against the flow of fluid therethrough, means for moving the valve and means associated with said valve for impeding the movement thereof in a direction to obstruct said passage-ways.

4. In a clutch, a rotary driving member including a body formed with an axial and radially arranged gear receiving compartments, and also with an axial fluid chamber therein, a rotary driven member including a propeller shaft journaled in said body and a gear fixed to said shaft and fitting closely within the axial compartment in said driving member, planetary gears journaled within the radially arranged compartments in the driving member and meshing with the gear on said shaft, said driving member being supplied with passage-ways, each intercepted by one of the planetary gears and the adjacent meshing portion of the axial gear, each passage-way leading from the chamber at one point and back to said chamber at another point, a valve in said chamber common to all of said passage-ways and adapted to obstruct the same, whereby more or less resistance may be offered against the flow of fluid therethrough and means associated with said valve for preventing the rapid movement thereof in a direction obstructing said passage-ways, but permitting of the relatively quick movement of said valve in the reverse direction.

In testimony whereof, I have signed my name to this specification.

SELMER A. KRAFT.